United States Patent [19]
Hornback

[11] Patent Number: 5,633,797
[45] Date of Patent: May 27, 1997

[54] METHOD AND SYSTEM FOR TESTING A WHEEL SPEED SENSOR INPUT CIRCUIT IN AN ABS AND/OR TC SYSTEM

[75] Inventor: Edward R. Hornback, Dexter, Mich.

[73] Assignee: Kelsey-Hayes Company, Romulus, Mich.

[21] Appl. No.: 388,556

[22] Filed: Feb. 14, 1995

[51] Int. Cl.$^6$ .................................................. G06F 11/00
[52] U.S. Cl. ................................. 364/424.034; 364/551.01; 371/67.1; 324/160
[58] Field of Search .................. 364/184, 424.03, 364/426.01, 426.03, 426.04, 550, 551.01, 565; 371/67.1, 71; 324/160

[56] References Cited

U.S. PATENT DOCUMENTS

| | | | |
|---|---|---|---|
| 4,116,494 | 9/1978 | Gudat | 303/122.08 |
| 4,656,588 | 4/1987 | Kubo | 364/426.02 |
| 4,836,616 | 6/1989 | Roper et al. | 303/122.06 |
| 4,912,969 | 4/1990 | Ishizeki | 73/121 |
| 4,926,683 | 5/1990 | Ishizeki | 73/118.1 |
| 5,404,304 | 4/1995 | Wise et al. | 364/426.04 |
| 5,418,453 | 5/1995 | Wise et al. | 324/160 |
| 5,459,732 | 10/1995 | Wise et al. | 364/426.02 |
| 5,477,472 | 12/1995 | Wise et al. | 364/574 |
| 5,487,595 | 1/1996 | Wise et al. | 303/168 |

*Primary Examiner*—Collin W. Park
*Attorney, Agent, or Firm*—MacMillan, Sobanski & Todd

[57] ABSTRACT

Test signals are generated by a microcontroller (i.e., micro) and coupled to a transistor which is in series with an inductive sensor of a wheel speed sensor input circuit to test the input circuit. In one test, a test signal from the micro sweeps through a range of predetermined frequencies to turn the transistor off and on to provide a simulated wheel speed signal which is used to compute a corresponding number of simulated wheel speeds. The programmed micro compares the simulated wheel speeds with the predetermined frequencies to determine if the various components of the circuit are operating properly and also to determine if the wheel speed arithmetic of the programmed micro is operating properly since actual wheel speed routines within the micro are used to compute the simulated wheel speeds. In another test, a low pass filter circuit coupled to an A to D input port of the micro are both tested by having the micro read the input port at various times before and after a second test signal from the micro is coupled to the transistor.

2 Claims, 2 Drawing Sheets

METHOD AND SYSTEM FOR TESTING A WHEEL SPEED SENSOR INPUT CIRCUIT IN AN ABS AND/OR TC SYSTEM

TECHNICAL FIELD

This invention relates to methods and systems for testing sensor input circuits to a microcontroller and, in particular, to methods and systems for testing wheel speed sensor input circuits in an ABS and/or TC system (ABS or TC system or both).

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms. Another such feature is traction control (i.e., TC).

Vehicle anti-lock brake systems are designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Typical vehicle anti-lock brake systems (i.e. ABS) include vehicle wheel speed sensors for providing inputs to an anti-lock brake system control unit. The control unit controls anti-lock brake system control valves interposed between the brake master cylinder and the individual wheel brakes of a hydraulic brake circuit. Such control valves include isolation valves and dump valves. The control valves, in turn, regulate hydraulic brake fluid pressure in the individual wheel brakes to implement anti-lock braking. An ABS pump pumps fluid from accumulators to the various control valves.

In operation, one or more of the vehicle wheel speed sensors provides input to the control unit for determining the vehicle speed. The control unit monitors the vehicle and vehicle wheel speeds for an indication of an anti-lock braking event. First, based upon the vehicle speed, the control unit typically determines a slip threshold. Using the vehicle velocity as a reference, slip threshold may be expressed as the difference between a selected velocity and the vehicle velocity.

In all ABS and/or TC control systems, wheel speed sensor continuity is self-tested by the ABS and/or TC microcontroller. Some systems measure the bias voltage which reflects the sensor resistance while others simply flip-flop the input circuit with a test pulse. These systems do not necessarily test the entire input circuit, but rather, focus on the sensor itself.

SUMMARY OF THE INVENTION

An object of the present invention is to provide a method and system to more completely test an entire wheel speed sensor input circuit.

Another object of the present invention is to provide a method and system to provide a more thorough test of an entire wheel speed sensor input circuit and parts of a microcontroller coupled to the circuit.

In carrying out the above objects and other objects of the present invention, a method for testing a wheel speed sensor input circuit including a wheel speed sensor in an ABS and/or TC system is provided. The method includes the steps of: a) generating a test signal having at least one predetermined frequency; and b) coupling the test signal to the input circuit to cause the input circuit to generate a simulated wheel speed signal. The method further includes the steps of: c) computing at least one simulated wheel speed based on the simulated wheel speed signal; and d) comparing the at least one simulated wheel speed with the at least one predetermined frequency of the test signal to determine if the wheel speed sensor input circuit is operating correctly.

Preferably, the test signal has a plurality of predetermined frequencies within a range of frequencies. Consequently, a plurality of simulated wheel speeds are computed and each simulated wheel speed is compared to its corresponding predetermined frequency.

Also, preferably, the test signal coupled to the input circuit causes a bias of the wheel speed sensor to alternate between high and low voltage levels at the at least one predetermined frequency.

Still further in carrying out the above objects and other objects of the present invention, a method is provided for testing a wheel speed sensor input circuit including a filter circuit having an output and a time constant in an ABS and/or TC system. The method includes the steps of: a) generating a test signal; and b) coupling the test signal to the input circuit to cause the output of the input circuit to change. The method further includes the step of: c) reading the output of the input circuit: i) immediately before step b) to obtain a first reference signal, ii) after step b) but before the output changes to obtain a second reference signal, and iii) after a predetermined time after step b) to obtain a third reference signal. The predetermined time is a function of the time constant. Finally, the method includes the step of: d) determining if the filter circuit is operating correctly based on the first, second and third reference signals.

Preferably, the ABS and/or TC system includes a microcontroller having an A to D input port coupled to the output of the filter circuit wherein the step of determining also determines if the A to D input port is operating correctly.

In carrying out the above objects and other objects of the present invention, a system is provided for carrying out each of the above method steps.

The advantages of the method and system of the present invention are numerous. For example, the following are tested:

The capability of an ASIC of the input circuit to pass a signal to the microcontroller;

The capture capability of the microcontroller;

The output timer of the microcontroller;

Some math functions in the microcontroller;

The low pass filter of the input circuit;

The A/D input port on the microcontroller; and

All the circuitry connected to the wheel speed sensor.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
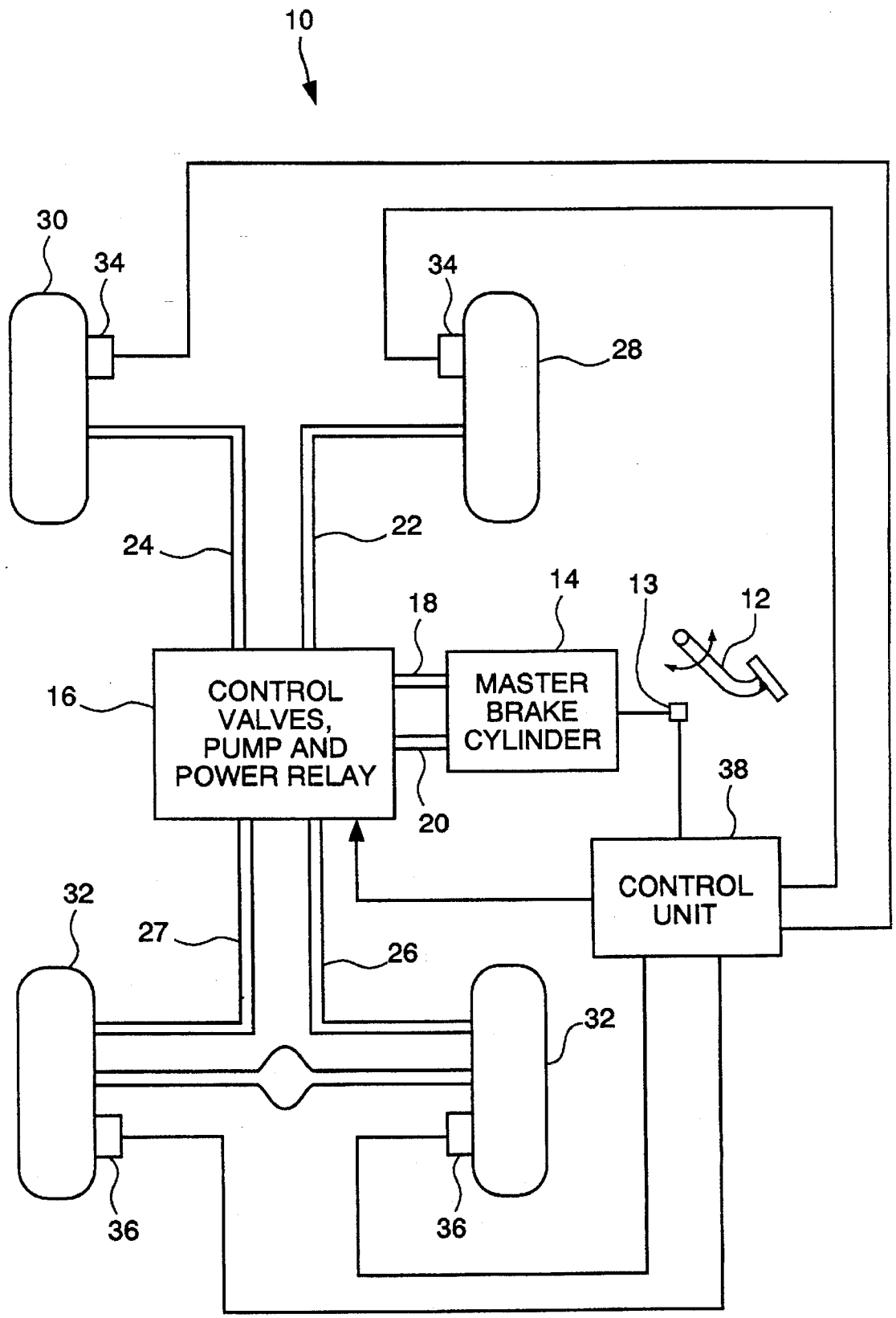
FIG. 1 is a schematic diagram of a vehicle and an interconnected ABS and/or TC system.

Referring now to FIG. 1, a schematic diagram of a motor vehicle denoted generally by reference numeral 10, in conjunction with a passenger vehicle anti-lock brake system (ABS) and/or traction control (TC) system (i.e., ABS or TC system or both) is shown. The vehicle 10 and system include a brake pedal 12, a brake switch 13, a brake master cylinder 14, control valves, pump and power relay collectively indicated at 16, brake fluid conduits 18, 20, 22, 24 and 26, as well as a right front wheel 28, a left front wheel 30, and a pair of rear wheels 32.

The ABS and/or TC system includes a pair of wheel speed sensor input circuits 34 for measuring the velocity of each of the front wheels 28 and 30, and a pair of wheel speed sensor input circuits 36 for measuring the velocity of each of the rear wheels 32. The system further includes an ABS control unit 38. Each of the input circuits 34 and 36 are operatively connected or coupled to the control unit 38. Such operative connections are preferably electrical, but may also be other types of connections, such as fiber optic.

The control unit 38 includes a commercially available microcontroller 42. Once programmed, the control unit 38 functions as a control means for activating the ABS.

Figure 2:
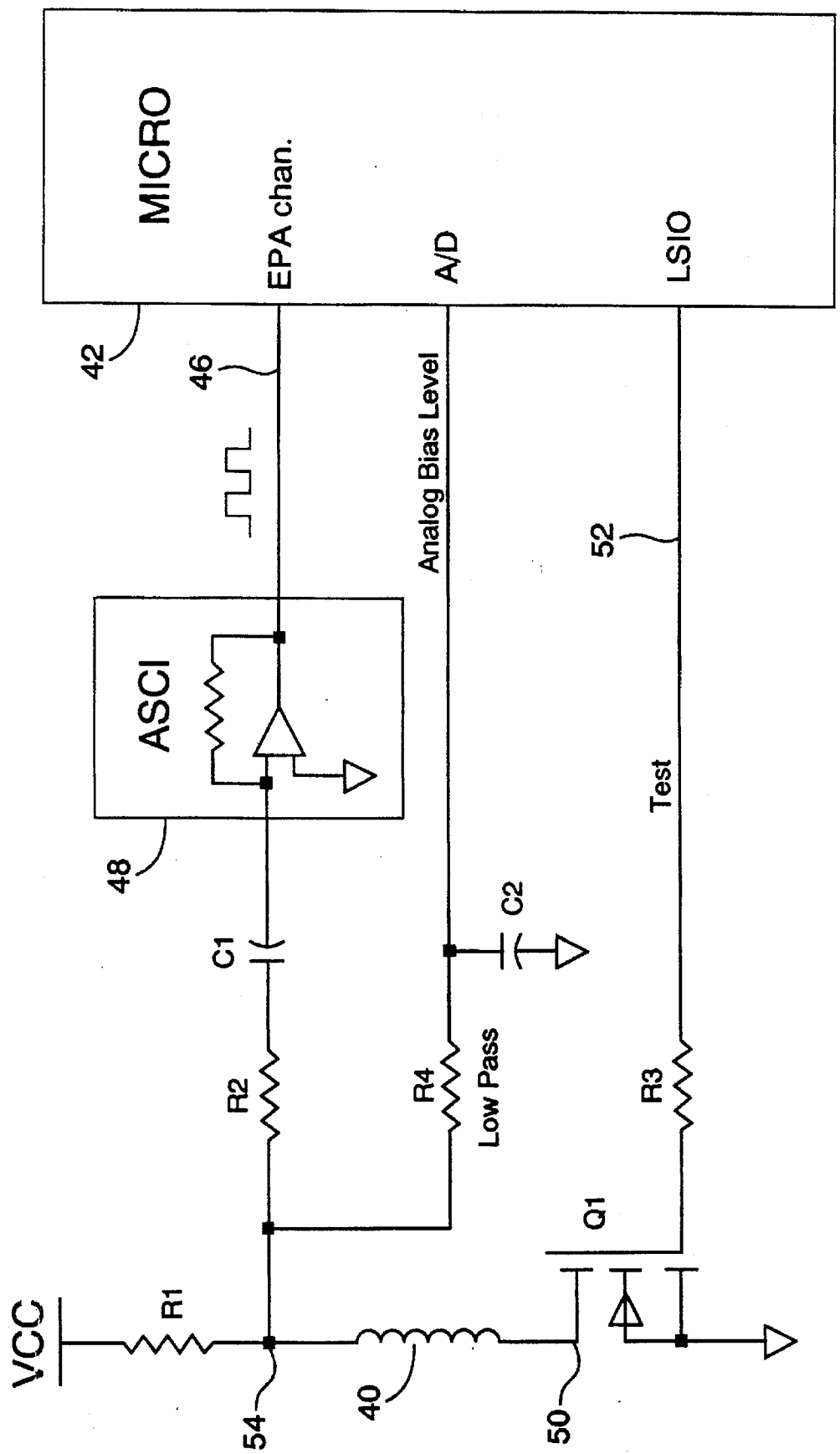
FIG. 2 is a schematic circuit diagram illustrating a method and system of the present invention for testing a wheel speed sensor input circuit of the ABS and/or TC system.

Referring now to FIG. 2, each wheel speed sensor 40 of its associated input circuit 34 or 36 may comprise a stationary variable reluctance sensor positioned adjacent a toothed wheel (not shown) which rotates with its respective vehicle wheel 28, 30, or 32. Each sensor 40 provides a series of analog pulses on a line 44 to a serially connected resistor R2 and capacitor C1. The frequency of the analog pulses is proportional to the speed or velocity of its corresponding wheel. The analog output of each speed sensor 40 is squared and converted into a digital pulse train on line 46 by an ASIC 48 which preferably includes a comparator circuit, one input of which is grounded. The input circuits 34 and 36 each generate a pulsed digital signal whose frequency varies directly with the speed of the respective vehicle wheels 28, 30, 32. Other well known wheel speed sensor configurations may also be employed.

The coil of each sensor 40 is pulled up by a pull up resistor R1 to provide a measurable bias level at an A/D input of the microcontroller 42. A low side 50 of the speed sensor coil is connected to ground through a field effect transistor, Q1, and is normally grounded (FET Q1 "on") when the vehicle is not at zero speed. In this mode, the sensor circuit 34 or 36 works comparable to the already established ohmic sensor test circuit previously described.

When the vehicle has been at zero speed for a few seconds, the microcontroller begins turning Q1 on and off along a line 52 through a resistor, R3, at a frequency controlled by a timer (not shown) in the microcontroller 42 that normally controls the ABS control valves. Q1 turning on and off causes the bias on a high side 54 of the sensor 40 to alternate between a high and low voltage level. An alternating logic level appears at the microcontroller 42 like a wheel speed signal. The microcontroller 42 computes a wheel speed using the same routines that are normally used when computing ABS velocity. The microcontroller 42 then compares the wheel speed with the frequency which it is applying to Q1. If the simulated input wheel speed matches the output frequency then the sensor circuit 34 or 36 is operating correctly.

Instead of testing at a constant frequency, the microcontroller 42 preferably sweeps through a range of frequencies to provide a more comprehensive test. Since this test uses the actual wheel speed routines, the wheel speed arithmetic is also tested.

The method and system can also be used to test a low pass filter including a resistor, R4, and a capacitor, C2, and the A/D inputs to the microcontroller 42 which are normally used to measure the sensor bias. In this instance, the microcontroller will turn Q1 off and then immediately read the A/D input. The voltage should be the same as it was just prior to turning off Q1. The microcontroller 42 then waits for about three time constants of the low pass filter (i.e. R4 and C2) before reading the A/D input again. The bias level at this time should be very close to five volts which appears at Vcc.

While the best mode for carrying out the invention has been described in detail, those familiar with the art to which this invention relates will recognize various alternative designs and embodiments for practicing the invention as defined by the following claims.

What is claimed is:

1. A method for testing a wheel speed sensor input circuit including a wheel speed sensor in an ABS and/or TC system, the method comprising the steps of:

a) generating a test signal having a plurality of different predetermined frequencies within a range of frequencies;

b) coupling the test signal to the input circuit to cause the input circuit to generate a simulated wheel speed signal;

c) computing a plurality of simulated wheel speeds based on the simulated wheel speed signal; and d) comparing each simulated wheel speed with its corresponding predetermined frequency of the test signal to determine if the wheel speed sensor input circuit is operating correctly wherein the test signal coupled to the input circuit causes a bias of the wheel speed sensor to alternate between high and low voltage levels at each of the plurality of different frequencies.

2. A system for testing a wheel speed sensor input circuit including a wheel speed sensor in an ABS and/or TC system, the system comprising:

a) means for generating a test signal having a plurality of different frequencies within a range of frequencies;

b) means for coupling the test signal to the input circuit to cause the input circuit to generate a simulated wheel speed signal;

c) means for computing a plurality of simulated wheel speeds based on the simulated wheel speed signal; and d) means for comparing each simulated wheel speed with its corresponding predetermined frequency of the test signal to determine if the wheel speed sensor input circuit is operating correctly wherein the test signal coupled to the input circuit causes a bias of the wheel speed sensor to alternate between high and low voltage levels at each of the plurality of different frequencies.

* * * * *